FIP8102 XR 3,023,374

TX5397E
X5220E
TX2565 (2)

Feb. 27, 1962 W. W. MUMFORD 3,023,374

NOISE GENERATOR

Filed April 20, 1959 2 Sheets-Sheet 1

INVENTOR
W. W. MUMFORD
BY Walter M. Kiel
ATTORNEY

3023374
OR IN 331/78

Feb. 27, 1962 W. W. MUMFORD 3,023,374

NOISE GENERATOR

Filed April 20, 1959 2 Sheets-Sheet 2

INVENTOR
W. W. MUMFORD
BY Walter M. Hill
ATTORNEY

United States Patent Office 3,023,374
Patented Feb. 27, 1962

3,023,374
NOISE GENERATOR

William W. Mumford, Parsippany-Troy Hills Township, Morris County, N.J., assignor to Bell Telephone Laboratories, Incorporated, New York, N.Y., a corporation of New York Filed Apr. 20, 1959, Ser. No. 807,726
11 Claims. (Cl. 331—78)

This invention relates to noise generators and, in particular but not exclusively, to microwave noise generators.

In order to be able to utilize the output intelligence of a piece of electronic apparatus, its output noise must be maintained below a definite level relative to the level of the output intelligence. This output noise is generally the result of input noise plus internally generated noise caused by electron collisions. The internally generated noise of a system is generally characterized by the term "noise figure," which, at a specified input frequency, is the ratio of (1) the total noise power per unit bandwidth at a corresponding output frequency delivered by the system into an output termination to (2) that portion of (1) engendered at the input frequency by the input termination at the standard noise temperature (290° K.). The noise figure of a piece of apparatus, therefore, is of particular importance when relatively small input signals are used because of the possibility of masking the output intelligence with the internally generated noise.

The use of noise generators for measuring the noise figures of apparatus is well known in the art. They are frequently used, for example, for measuring the noise figures of receivers. Such generators should be relatively stable and should have substantially constant power outputs over the frequency bandwith of the apparatus under test. Gas discharge devices have been found to exhibit these characteristics and consequently have been used as noise generators.

One method by which the noise figure of apparatus has been obtained in the past is by inserting a gaseous discharge tube in a waveguide so that its axis is substantially perpendicular to that of the waveguide and maintaining relatively good impedance matches between the gaseous tube source, waveguide and apparatus. With good impedance matches approximately one half of the noise power generated by the tube is coupled into the apparatus. When, however, it is not possible or practical to maintain relatively good impedance matches, the power coupled into the apparatus then varies in a cyclic manner as a function of the length of the transmission line interconnecting the tube and the apparatus. Because of this phenomenon, a relatively good impedance match should be maintained.

One technique employed to reduce the effect of the transmission line length on the power coupled into the apparatus under test is disclosed in U.S. Patent No. 2,716,192 issued to H. Johnson on August 23, 1955. In accordance with the teachings of this prior art patent, a gaseous discharge tube is inserted through a waveguide with its axis at a small angle with the waveguide axis. Although this arrangement produces the desired result, it has been found that several wavelengths of the waveguide are necessary to insert the tube because of the small angle the tube makes with the waveguide.

An object of the present invention is to reduce the length of waveguide required for a noise generator which couples noise power into a mismatched load, the noise power remaining substantially constant with variations of the length of the transmission path between the generator and the load.

This and other objects are attained in accordance with the present invention by injecting noise into a transmission line at two or more points or locations along its length so that noise is injected at only one of these points at any one time. These points are effectively spaced with respect to one another by a distance equal to $\lambda/NP$ where lambda is the wavelength of the desired noise frequency within the waveguide, N is the number of injection points and P is any number greater than $$\frac{2(N-1)}{N}$$

A brief examination of the effective spacing factor $\lambda/NP$ shows that all of the injection points defined by this factor lie within one half of a wavelength. Each injection point, therefore, is at an impedance level different from the impedance levels of the other injection points. By this arrangement, a more nearly constant average noise power is delivered to a mismatched load when the length of the line between the generator and load is varied or when the operating frequency is varied. Furthermore, it has been found that an optimum value of effective spacing is realized when P equals two.

In several embodiments of the present invention, noise is injected into a wave guide transmission path by the use of gaseous discharge tubes. It is sometimes impractical, if not impossible, to place the desired number of these devices within a distance of one half of a wavelength. As the impedance along a transmission line is repeated at one half wave length intervals, it is possible to displace any one or more of the points of injection by a multiple of one half wavelengths without detracting from its intended function. The term "effective spacing" is therefore meant to imply the spacing of the points of injection when they are all referred to the same one-half wavelength of the transmission line.

One embodiment of the invention uses a pair of gaseous discharge tubes. These tubes are inserted in a waveguide so that the tube axes are parallel with respect to one another while they are perpendicular to the axis of the waveguide. For optimum operation, the tubes are spaced with respect to one another by an odd multiple of one-quarter wavelengths of the desired noise frequency. The tubes are connected to a source of alternating voltage in a reverse sense with respect to one another so that they are turned on and off alternately and in synchronism with the alternating voltage.

Other objects and features of the invention will be apparent from a study of the following detailed descriptions of several specific illustrative embodiments.

Figure 1:
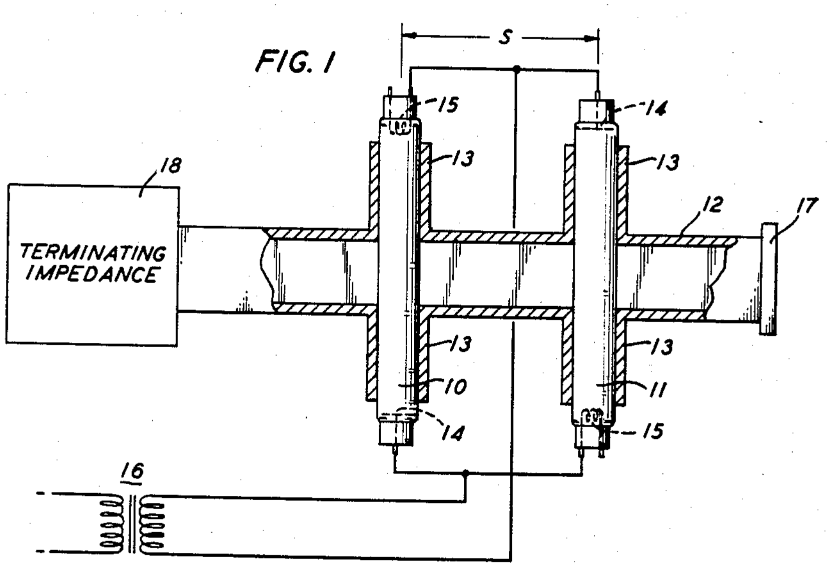
FIG. 1 illustrates a two-tube embodiment of the invention.

FIG. 1 illustrates one embodiment of the invention. In this embodiment a pair of gaseous discharge tubes 10 and 11 are inserted in a waveguide 12 so that the axes of the tubes are parallel with respect to one another and perpendicular to the axis of the waveguide. These tubes are also displaced with respect to one another by an optimum spacing *s* which is equal to an odd multiple of one-quarter wavelengths of the center frequency of the frequency band of interest. Metallic shields 13 surround tubes 10 and 11 on the exterior of waveguide 12. Each of the tubes 10 and 11 contains an anode 14 and a filament type cathode 15. Filament supply sources may be connected to the filament type cathodes 15, although it has been found that the embodiment is operative in the absence of such sources. Although the tubes are shown with their anode ends projecting on respective sides of waveguide 12, the embodiment is operable equally as well with both anode ends projecting on the same side of waveguide 12. Anode 14 of tube 10 and cathode 15 of tube 11 are connected to one extremity of the secondary winding of a transformer 16 while the remaining anode and cathode are connected to the other extremity of this winding. The primary winding of transformer 16 is connected to a source of alternating current which, for example, may be either 60 or 400 cycles per second. Because tubes 10 and 11 are connected across the secondary winding of transformer 16 in a reverse sense with respect to one another they are fired alternately in synchronism with the alternating source connected to the primary winding of transformer 16. One extremity of waveguide 12 is terminated in a coupling 17 while the other extremity is terminated in an impedance 18, the value of which is equal to the characteristic impedance of waveguide 12.

Figure 2:
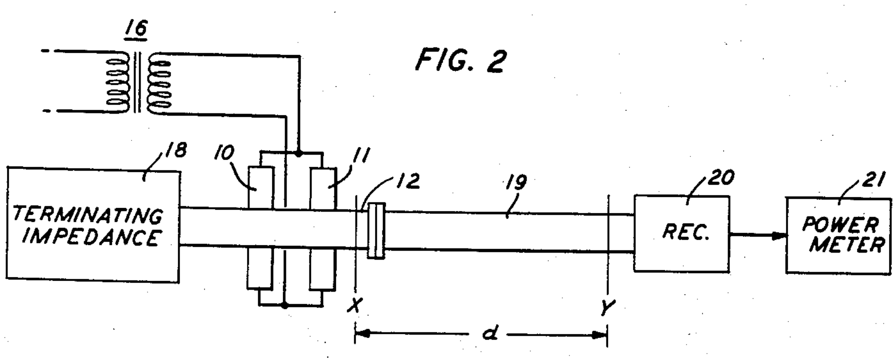
FIG. 2 shows the embodiment of FIG. 1 in a circuit arrangement for measuring the noise figure of a receiver.

FIG. 2 shows the embodiment of FIG. 1 connected by way of a waveguide 19 to a receiver 20. Waveguide 19 has the same characteristic impedance as waveguide 12. An output meter 21 is connected to the output of receiver 20. Impedance 18 may, for example, comprise an antenna when frequent monitoring of the noise figure is desirable.

Figure 3:
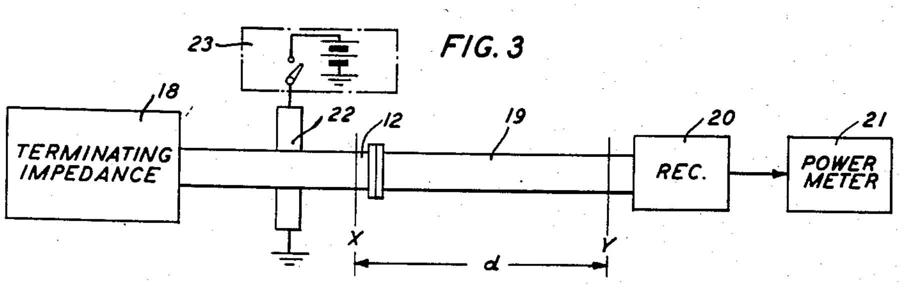
FIG. 3 shows a prior art noise source in a circuit arrangement for measuring the noise figure of a receiver.

Before considering the operation of the arrangement shown in FIG. 2, the operation of the arrangement shown in FIG. 3 will be considered. In FIG. 3 the two-tube alternately fired embodiment of the invention shown in FIG. 2 has been replaced by a prior art noise source comprising a single tube 22 which may be continuously fired by a source 23. The noise figure F of receiver 20 having a single frequency band response is $$F=\frac{\frac{T2}{290}-1}{Y-1} \qquad (1)$$

where T2 is the absolute effective temperature of the combination of the noise source when fired and the terminating impedance and $$Y=\frac{GN_g2+N_n}{GN_g1+N_n}$$

where G is the gain of receiver 20, N*g*1 is that part of the noise power coupled into receiver 20 with the terminating impedance at 290° absolute temperature (i.e., with the source unfired), N*g*2 is that part of the noise power coupled into receiver 20 with the source and terminating impedance at an effective temperature T2, and N*n* is the noise power produced by receiver 20. Quantity Y, in other words, is the ratio between the receiver output with the noise source fired and the receiver output with the source unfired. The temperature T2 and the two receiver noise outputs are measurable quantities.

The derivation of the noise figure equation may be found, for example, in an article entitled "A Broad-band Microwave Noise Source," by W. W. Mumford, beginning on page 608 of the October 1949 issue of the Bell System Technical Journal.

Figure 4:
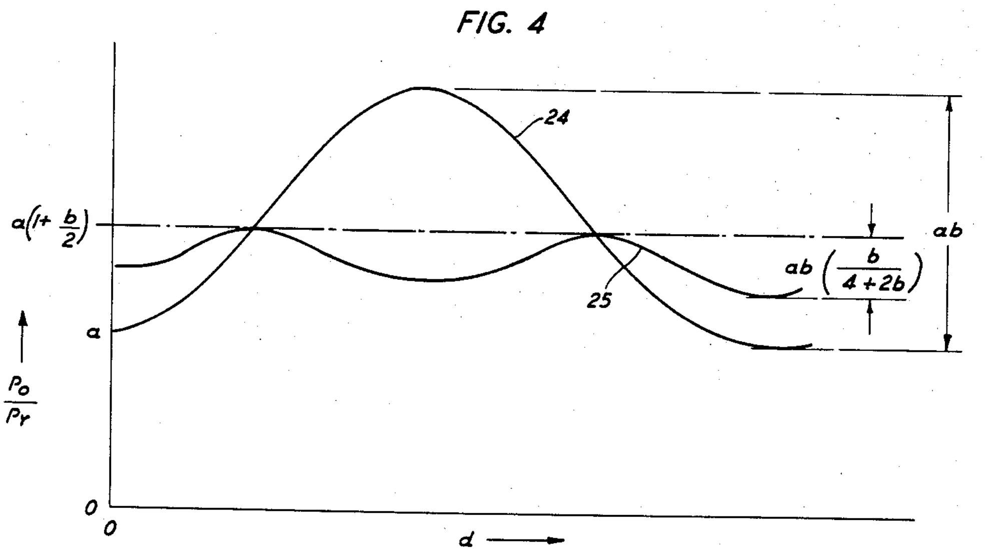
FIG. 4 is a graph illustrating some of the advantages of the present invention.

Noise figure measurements made in accordance with the above procedure, however, may be in error because of impedance mismatches between the source and receiver 20. In particular, each of the receiver noise outputs comprises an amplified part of the source noise power plus the noise generated within receiver 20. Although the noise power generated by the source at a particular temperature is a calculable quantity (see, for example, the above-referred to article) the part of it coupled into receiver 20 is affected by the length of the transmission path between the source and receiver 20 when there is an impedance mismatch. With a mismatched condition, the power coupled into receiver 20 varies in a cyclic manner with the length of the transmission path between the source and receiver 20. For a particular impedance mismatch, the ratio of the power P*o* that can be coupled into receiver 20 under perfect impedance matched conditions to the actual power P*r* that is coupled into receiver 20 is $$\frac{Po}{Pr}=a\left(1+b\sin^2\frac{2\pi d}{\lambda}\right) \qquad (2)$$

where $$a=\frac{(Rg+Rr)^2}{4RgRr}$$

and $$b=\frac{(Rg^2-Zo^2)(Rr^2-Zo^2)}{Zo^2(Rg+Rr)^2}$$

with R*g* equal to the impedance of the noise generator as viewed from voltage null point *x*, R*r* equal to the impedance of receiver 20 as viewed from voltage null point *y*, Z*o* equal to the characteristic impedance of waveguides 12 and 19, *d* equal to the distance between points *x* and *y*, and λ equal to the wavelength of the desired noise frequency within the waveguide. This equation follows from the substitution of equations (3.5–3) on page 53 and (3.4–7) on page 48 in equation (3.5–14) on page 56, all of Principles and Applications of Waveguide Transmission, by G. C. Southworth, reprinted in June 1954 by D. Van Nostrand Company, Inc. Waveform 24 of FIG. 4 is a plot of this equation as a function of distance *d*. From the power ratio equation, it is readily ascertained that the ratio fluctuates as a function of distance *d* by an amount equal to (*ab*). An inspection of the quantities *a* and *b* demonstrates that the greater the mismatch, the greater this fluctuation.

In accordance with the invention, when the two-tube alternately fired generator is used as shown in FIG. 2, the power coupled into receiver 20 is the sum of the average noise powers from the two tubes. The power ratio equation now becomes $$\frac{Po}{Pr}=\frac{Po}{\frac{Pr1}{2}+\frac{Pr2}{2}}=\frac{2}{\frac{Pr1}{Po}+\frac{Pr2}{Po}} \qquad (3)$$

where $$\frac{Pr1}{2} \text{ and } \frac{Pr2}{2}$$

are the average noise powers coupled into receiver 20 by the respective tubes as a result of the tubes being alternately fired. By substituting the reciprocal of Equation (2) for each part of the denominator of Equation (3), while taking into consideration the spacing between the tubes, the following equation results $$\frac{Po}{Pr}=2a\left(\frac{1+b}{2+b}\right)\left[1+\left(\frac{b^2}{4+4b}\right)\sin^2\frac{4\pi d}{\lambda}\right] \quad (4)$$

where $a$, $b$, and $d$ have the same definitions as in Equation (2). Waveform 25 of FIG. 4 is a plot of Equation (4) as a function of distance $d$. Further examination of Equations (2) and (4) and waveforms 24 and 25 discloses that the maximum amplitude of waveform 25 coincides with the average amplitude of waveform 24 while the minimum amplitude of waveform 25 can never be less than the minimum amplitude of waveform 24. In other words, the power ratio fluctuation is reduced by a factor of $$\frac{b}{4+2b}$$

which can never exceed one half. This reduction may be further appreciated by considering a particular impedance mismatched condition. With, for example, $Rg=Rr=1.25Zo$ (which is a realistic mismatch resulting in a standing wave ratio of approximately 1 db), the variation in the power ratio of the single tube arrangement of FIG. 3 as the distance $d$ is varied is approximately 4.9% of the average power ratio. With the two-tube alternately fired embodiment of the present invention as shown in FIG. 2, the variation of the power ratio as the distance $d$ is varied is reduced to approximately 0.06% of the average power ratio. This represents an improvement of about 80 to 1. The effect of the transmission line length has, therefore, been materially reduced, thereby making it unnecessary to use accurately measured transmission lines each time the noise figure of a receiver is measured. Furthermore, when the diameter of metallic shields 13 is less than one quarter of a wavelength, the length of waveguide required for this embodiment may be as short as one quarter of a wavelength plus the diameter of the metallic shields. When the diameter of the shields is greater than one-quarter wavelength, the spacing $s$ may be increased by increments of one-half wavelengths and the previously presented equation and explanation will still apply. In other words, the effective spacing is still one quarter of a wavelength.

The embodiment of FIGS. 1 and 2 has been considered with spacing $s$ equal to an odd multiple of one-quarter wavelengths of the frequency of interest. Although these spacings provide an optimum reduction in power ratio fluctuations with changes in transmission line length, other spacings may be used with some of the advantages of the invention being obtained. However, as the spacing is increased (or decreased) from an odd multiple of one-quarter wavelengths, the fluctuations increase until the spacing is a multiple of one-half wavelengths, at which time the single-tube continuously fired fluctuations are obtained.

Tubes 10 and 11 in their unfired states introduce a capacity effect in the waveguide. This effect can be substantially cancelled, when desired, by providing inductive loading at the tubes. In accordance with known techniques, inductive vanes or posts parallel to the electric vector may be placed next to the tubes to produce the desired inductive loading.

Figure 5:
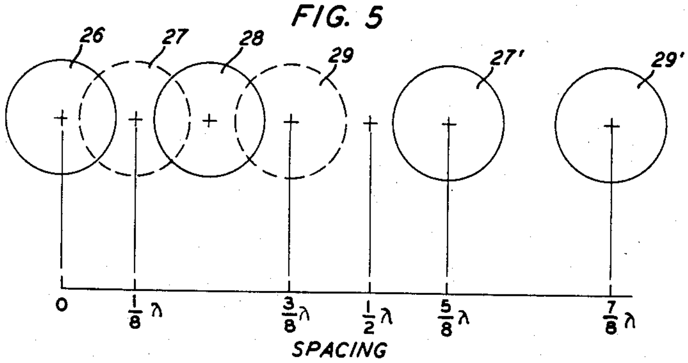
FIG. 5 illustrates one spacing arrangement for a four-tube embodiment of the invention.
Figure 6:
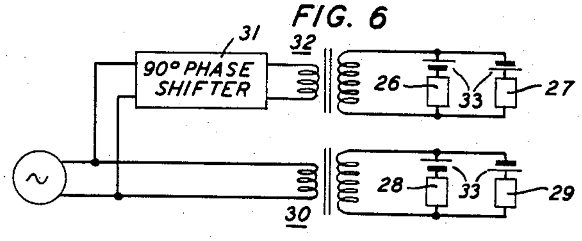
FIG. 6 is a schematic diagram of a circuit that may be used for firing a four-tube embodiment of the invention.

FIG. 5 illustrates one spacing arrangement for a four-tube embodiment of the invention where all four tubes cannot be accommodated within one half of a wavelength. Using $P=2$ for optimum results, the effective spacing factor becomes $\lambda/8$. Circles 26, 27, 28 and 29, which represent the respective tubes, are shown with their centers progressively displaced by $\lambda/8$. However, as stated previously, all four tubes cannot be accommodated within one half of a wavelength and therefore the circles overlap one another. This condition is eliminated in accordance with the invention by moving each of the two tubes represented by circles 27 and 29 by a distance of $\lambda/2$ to circles 27' and 29'. The four tubes may be individually turned on and off through the use of any one of a number of techniques. FIG. 6, for example, illustrates one firing arrangement that may be used in which an alternating voltage is applied directly across the primary winding of a transformer 30 while the same alternating voltage is phase shifted in a 90° phase shifter 31 and then applied across the primary winding of a second transformer 32. Tubes 26 and 27 are connected in a reverse sense, as in FIG. 1, across the secondary winding of transformer 32 while tubes 28 and 29 are connected in a reverse sense across the secondary winding of transformer 31. Each of the tubes 26, 27, 28 and 29 is reverse biased by a source 33 so that the amplitude across its associated transformer secondary winding must exceed a predetermined level in one polarity sense before the tube turns on. With this particular wiring arrangement, the tubes turn on and off in a 28, 26, 29, 27 sequence. Any sequence may be used to turn the tubes on and off.

Any number of noise sources greater than one may be used in practicing the invention. The variation in the power ratio as the transmission line length is changed decreases as the number of noise sources is increased. The particular number that should be used, therefore, depends upon the power ratio variation that can be tolerated. The relatively simple two-source alternately fired version has been found to provide satisfactory results for many present day requirements.

Although the invention has been illustrated and described through the use of gaseous discharge tubes, it is not limited to these devices. Various other types of noise sources may be employed without departing from the spirit and scope of the present invention.

What is claimed is:

1. In combination, a transmission line, and means for injecting noise power into said transmission line at least at two locations to increase noise power in said line, said locations effectively spaced with respect to one another by a distance equal to $\lambda/NP$ where $\lambda$ is the wavelength of the specified frequency of said noise power, N is the number of said locations and P is any number greater than $$\frac{2(N-1)}{N}$$

said means injecting said noise power into said line at only one location at any one time.

2. Apparatus in accordance with claim 1 wherein means having an impedance substantially equal to the characteristic impedance of said line terminates one extremity of said line.

3. Apparatus in accordance with claim 1 wherein P equals two.

4. Apparatus in accordance with claim 3 wherein means having an impedance substantially equal to the characteristic impedance of said line terminates one extremity of said line.

5. In combination, a transmission line, at least two noise sources for injecting noise power into said transmission line to increase noise power in said line, said noise sources being effectively spaced with respect to one another by a distance equal to $\lambda/NP$ where $\lambda$ is the wavelength of the specified frequency of said noise power, N is the number of said noise sources and P is any number greater than $$\frac{2(N-1)}{N}$$

and means for turning said noise sources on and off so that only one of said sources is on at any one time.

6. Apparatus in accordance with claim 5 wherein means having an impedance substantially equal to the characteristic impedance of said line terminates one extremity of said line.

7. Apparatus in accordance with claim 5 wherein P equals two.

8. Apparatus in accordance with claim 7 wherein means having an impedance substantially equal to the characteristic impedance of said line terminates one extremity of said line.

9. In combination, a transmission line, two noise sources for injecting noise power into said transmission line at locations spaced with respect to one another by an odd number of one-quarter wavelengths of the frequency of said noise power to increase noise power in said line, and means for alternately turning said noise sources on and off.

10. Apparatus in accordance with claim 9 wherein said noise sources comprise gaseous discharge devices.

11. Apparatus in accordance with claim 10 wherein means comprises an alternating source of voltage and means for applying said voltage to said tubes in a reverse sense with respect to one another.

References Cited in the file of this patent

UNITED STATES PATENTS 2,814,777 Peters et al. ---------------- Nov. 26, 1957